(No Model.)

J. H. BARKER.
TWO WHEELED VEHICLE.

No. 321,477. Patented July 7, 1885.

Attest:
A. M. Iliff
S. May

Inventor:
Joseph H. Barker
per
L. M. and R. M. Hosea
Attys.

United States Patent Office.

JOSEPH H. BARKER, OF CINCINNATI, OHIO.

TWO-WHEELED VEHICLE.

SPECIFICATION forming part of Letters Patent No. 321,477, dated July 7, 1885.

Application filed January 3, 1885. (No model.)

*To all whom it may concern:*

Be it known that I, JOSEPH H. BARKER, a citizen of the United States, residing at Cincinnati, Ohio, have invented new and useful Improvements in Shaft Attachments for Two-Wheeled Vehicles, of which the following is a specification.

My invention relates to two-wheeled vehicles, being an improved mode of attaching the shafts thereto, as hereinafter set forth, its object being to provide means for a permanent adjustment of the angle of the shafts thereto with reference to the size or height of the horse, and also an automatic adjustment allowing for the oscillation of the shafts in relation to the vehicle-body, thereby preventing the disagreeable "tilting" motion due to the movements of the horse.

Figure 1:
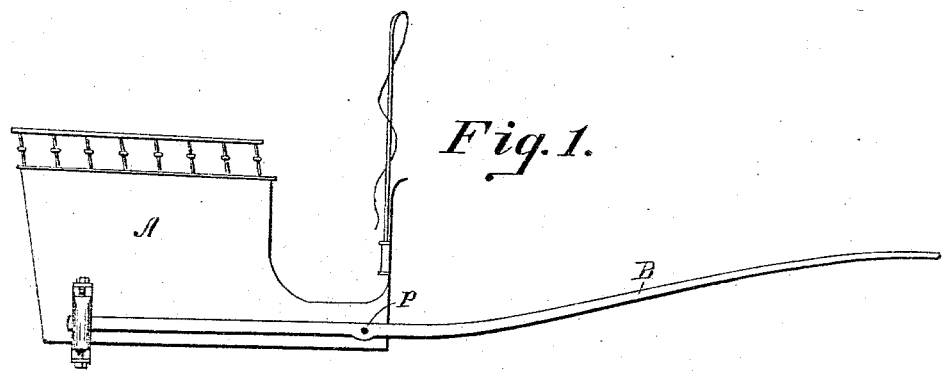
Figure 2:
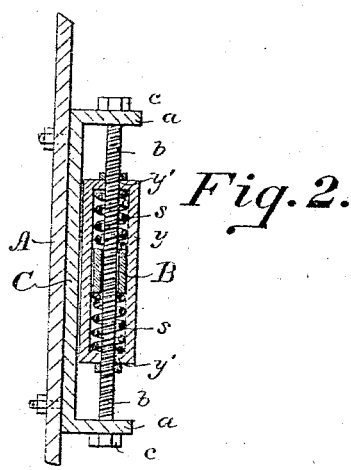

My invention is embodied in mechanism illustrated in the accompanying drawings, in which Figure 1 is a general side elevation of a buggy to which the improved attachment is applied; Fig. 2, a vertical cross-section of the shaft attachment on a somewhat enlarged scale, and Fig. 3 a vertical section of the same in the line of the shaft.

In the drawings I have shown the shaft B pivoted to the vehicle-body at $p$ in the usual manner, the adjustment being provided for at the rear end of the shaft, as is customary. Previous to my improvement, so far as I am aware, the only adjustment was in the nature of a clevis arrangement similar to that employed in plow construction, by which the angle of the shaft in relation to the vehicle-body could be changed by a pin-connection to certain fixed points within the limits of a fixed containing-yoke; but the trouble of removing and replacing the pin or bolt, the lost motion due to constant wear, and the liability to loss of the bolt render this arrangement objectionable. My improvement in this respect substitutes a screw, upon which the shaft is adjustable vertically to any angle desired by the rotation of the screw. The connection of the shaft with the screw is through the medium of a yoke threaded upon the latter, in which the shaft has a limited play between springs acting to retain it in proper normal position.

Figure 3:
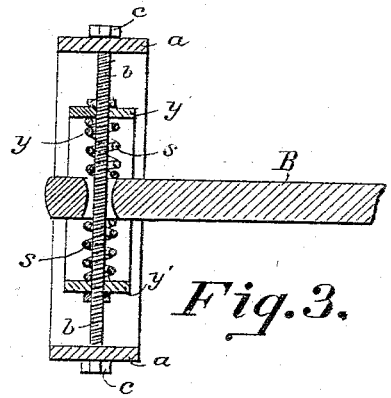

Referring again to the drawings, Figs. 2, 3, A designates the vehicle-body; C, a vertical plate attached to the vehicle-side, sufficiently extended to allow the desired adjustment of the shaft and its rectangular containing-yoke Y between horizontal flanges $a$, terminating the plate above and below. Vertically through the flanges $a$ is passed a bolt, $b$, passing through the end walls, $y'$, of the yoke, with which it engages by its holding-threads in such manner that the rotation of the bolt moves the yoke up or down alongside of the plate C. The shaft B is extended into the yoke, being perforated for the passage and vertical oscillation of the shaft, without contact, over the bolt, and is retained in its normal position centrally in the yoke by springs $s$ $s$, interposed within the yoke around the bolt above and below the shaft. The opening of the yoke is the width of the shaft, which therefore moves vertically between the side walls of the yoke as a guide, and thus has a limited play, as permitted by the springs, without reference to the general permanent adjustment of the angle of connection with the vehicle-body.

In the drawings the bolt $b$ is shown provided with enlarged heads $c$ $c$, which secure it permanently to and between the flanges $a$ and the yoke Y, adjustable on the bolt by the rotation of the latter; but it will be obvious that the bolt may be vertically adjustable in relation to the flanges, carrying the yoke rigidly attached, by substituting set-nuts for the permanent heads $c$, and lengthening the bolts, the arrangement being an obvious mechanical equivalent, but undesirable.

In some cases, also, it might be practicable to pivot the shafts at the rear and place the adjusting mechanism in the position of the present pivot; but this involves no functional difference, and is within the purview of my invention.

It will of course be understood that a similar connection is provided at each side of the vehicle-body for each terminal of the shafts; also, that the springs $s$ permit a limited oscillation of the shafts in relation to the body of the vehicle, whereby the body remains comparatively steady, notwithstanding the vertical movements of the horse.

I claim as my invention and desire to secure by Letters Patent—

1. In a two-wheeled vehicle, in combination with shafts pivotally secured to the body, adjustable yokes Y, in which the shafts are retained between springs acting vertically in opposite directions against the shafts, as set forth.

2. In two-wheeled vehicles, the combination, with the body and shafts, of a plate, C, provided with flanges $a$, bolt $b$, and yoke Y, provided with springs $s$, arranged and operating substantially as and for the purpose set forth.

In testimony whereof I have hereunto set my hand in the presence of two subscribing witnesses.

JOSEPH H. BARKER.

Witnesses:
R. M. HOSEA,
L. M. HOSEA.